United States Patent [19]
Williams

[11] Patent Number: 5,196,836
[45] Date of Patent: Mar. 23, 1993

[54] TOUCH PANEL DISPLAY

[75] Inventor: Donald D. Williams, Boca Raton, Fla.

[73] Assignee: International Business Machines Corporation, Armonk, N.Y.

[21] Appl. No.: 839,824

[22] Filed: Feb. 21, 1992

Related U.S. Application Data

[63] Continuation of Ser. No. 723,347, Jun. 28, 1991, abandoned.

[51] Int. Cl.$^5$ ............................................. G09G 3/02
[52] U.S. Cl. ................................... 340/712; 340/784; 340/765; 250/221; 250/227.21
[58] Field of Search ..................... 340/712, 784, 765; 178/18; 250/221, 227.22, 227.21, 229

[56] References Cited

U.S. PATENT DOCUMENTS

| | | | |
|---|---|---|---|
| 4,247,767 | 1/1981 | O'Brien et al. | 250/221 |
| 4,703,316 | 10/1987 | Sherbeck | 340/706 |
| 4,733,068 | 3/1988 | Theile et al. | 250/227 |
| 4,766,424 | 8/1988 | Adler et al. | 340/712 |
| 4,847,606 | 7/1989 | Beiswenger | 340/712 |
| 4,990,901 | 2/1991 | Beiswenger | 340/712 |
| 5,001,306 | 3/1991 | Purcell | 178/18 |

Primary Examiner—Jeffery A. Brier
Assistant Examiner—A. Au
Attorney, Agent, or Firm—R. Strimaitis

[57] ABSTRACT

A optical input device which can determine the location of a stylus in a field with only a single emitter and a single detector. A fiber-optic bundle is used to transmit energy from the emitter to the vertical and horizontal output sides of a bezel. The fiber-optic bundle returns energy from the input vertical and horizontal sides of the bezel to the detector. The bezel is covered by LCD masks which block energy transmission through the bezel. A multiplexor scans the LCD masks to allow a beam of energy to scan across the vertical and horizontal fields of the device. The location of a stylus is located by detecting an interrupted beam.

23 Claims, 3 Drawing Sheets

TOUCH PANEL DISPLAY

RELATED ART

This is a continuation of co-pending application, Ser. No. 07/723,347 filed on June 28, 1991, now abandoned

BACKGROUND OF THE INVENTION

1. Technical Field

The present invention relates to touch input devices. In particular, to opto-matrix frames having a minimum component count.

2. Background Art

Historically, keyboards were used to interact with display devices. Due to the needs of particular users, a number of alternative methods of interacting with display devices were developed. Included in the alternatives were items such as mice, light pens, tablets, joysticks, and the like. All of these methods have the disadvantage of requiring hardware extraneous to the display. The development of touch panel displays provided an alternative method of interacting with a display device which has the additional advantage of not requiring hardware extraneous to the displays touch panel displays allow a user to interact by first presenting information on the screen. Then the user interacts by touching the screen at locations based on information displayed on the screen. The touch panel senses the location of the finger or stylus and communicates that information to the computer.

There are known alternative methods of designing touch panel displays. One method uses a transparent membrane switch which covers the surface of the display screen. Over time, the membrane design creates vision problems for the user. This is because the membrane lies directly over the screen. Therefore, membrane wear will have a direct effect on how well a user can see the display. A preferable method is the opto-matrix display. This type of touch panel display places nothing on the surface of the screen, eliminating the problems caused by membrane wear. Further, the frequency of energy used can be selected so that it is outside of the visible light range, thereby rendering the matrix invisible to the user.

However, a disadvantage associated with opto-matrix touch panel displays is the high component count and consequent high manufacturing expense. For example, a large number of light emitting diodes (emitters) are required to create the optical matrix. A correspondingly large number of detectors paired with corresponding emitters, are required to detect light, or its absence, in the matrix. Further, scanning the emitters and monitoring the detectors typically requires significant on-board processing capability to scan the emitter/detector pairs, measure the difference between detector output before and after the emitter is turned on, and determine if a stylus is present at a given location. Touch panel displays also include digital to analog converters to allow data to be converted prior to being transferred to computers. Due to the difference in strength of emitter signals and the difference in sensitivity of detector output, errors can arise in the form of false stylus detection or failure to detect a stylus when present. Addressing the problems created by the difference in emitter/ detector signals results in additional hardware.

Some attempts have been made to reduce the number of emitters and detectors required for the optical matrix in the display. For example, U.S. Pat. No. 4,733,068 to Sherbeck discloses a method of reducing the number of emitters by placing emitters in the corners of the bezel with a plurality of detectors on opposing sides of the bezel. This approach allows the number of emitters to be reduced, but at the same time prevents any reduction in the number of detectors. Likewise, U.S. Pat. No. 4,766,424 to Adler et al uses a similar approach by attaching a diode connected to a light conducting strip to two sides of the bezel and exciting them with a plurality of emitters on the other two sides of the bezel. This approach allows the number of detectors to be reduced but prevents any reduction in the number of emitters. As a result, while attempts to reduce the number of emitters and detectors have been successful, the very solutions to the problem of reducing the number of emitters prevents reduction in the number of detectors, and the solution to the problem of reducing the number of detector has prevented the reduction of both emitters. Therefore, the prior art has not shown the ability to reduce the number of emitters and detectors at the same time.

The prior art has failed to provide touch panel input device that not only has the known advantages of opto-matrix displays, such as the absence of extraneous hardware, and the superior visual qualities of opto-matrix touch panels over membrane touch panel input devices, but one which also overcomes the disadvantages of known opto-matrix touch panel devices, which results in high cost primarily due to the number of components required to implement such a device and in particular due to the large number of emitters and detectors required to operate an optical touch panel display, and the additional circuitry required to correct differences in signal strength of emitters and detectors.

SUMMARY OF THE INVENTION

It is an object of this invention to reduce the number of components in an optical input device to a number heretofore unattainable.

It is another object of this invention to reduce the required number of emitters and detectors in an optical input device to on each.

It is a further object of this invention to transmit energy to and from an optical input device with a fiber optic bundle.

It is a still further object of this invention to control scanning of an optical energy field with optical masks.

These and other objects which will become apparent during the discussion of the preferred embodiment are accomplished by a system which uses a fiber optic bundle to transmit energy from a single energy source such as an emitter to the sides of a bezel and return detected energy from opposite sides of the bezel to a single detector. A transparent window in a darkened LCD mask is scanned across the mask to move a beam of energy across the vertical and horizontal planes of the display.

DESCRIPTION OF THE PREFERRED EMBODIMENT

For ease of discussion, the following terms will be used in this disclosure. The term "opto-matrix input device" will be used interchangeably with the term "touch panel" and "optical input device". The term "opaque point" will be used interchangeably with the term "stylus." The term "light" will be use interchangeably with "energy" or "emitted energy" or "infra-red". A stylus can be anything used to block the energy beam between an emitter and a detector, such as a finger, pencil, or the like.

In addition, the terms "vertical side" and "horizontal side" as defined in this specification and its associated claims have the following meaning. The terms are used for illustrative purposes throughout the application to reflect the commercial reality of how display terminals are typically designed. Those skilled in the art will recognize that the screen on a display device need not have any particular shape and that a touch panel display screen can just as easily be designed in the form of any polygon or other shape which allows a specific location to be identified by intersecting energy beams in addition to the special case (here disclosed) of a right rectangle. Further, the terms "vertical" and "horizontal", are used for ease of illustration herein merely to illustrate a general difference in orientation between different sets of opposing sides of such a polygon or other shape, and they may in fact be more or less than ninety degrees apart and do not depend on a relationship with external points such as the ground. For example, as illustrated herein the "vertical" and "horizontal" sides which are substantially vertical and horizontal to one another may in fact be mounted flat within a tabletop surface such that no side is vertical in relation to the ground.

Figure 1:
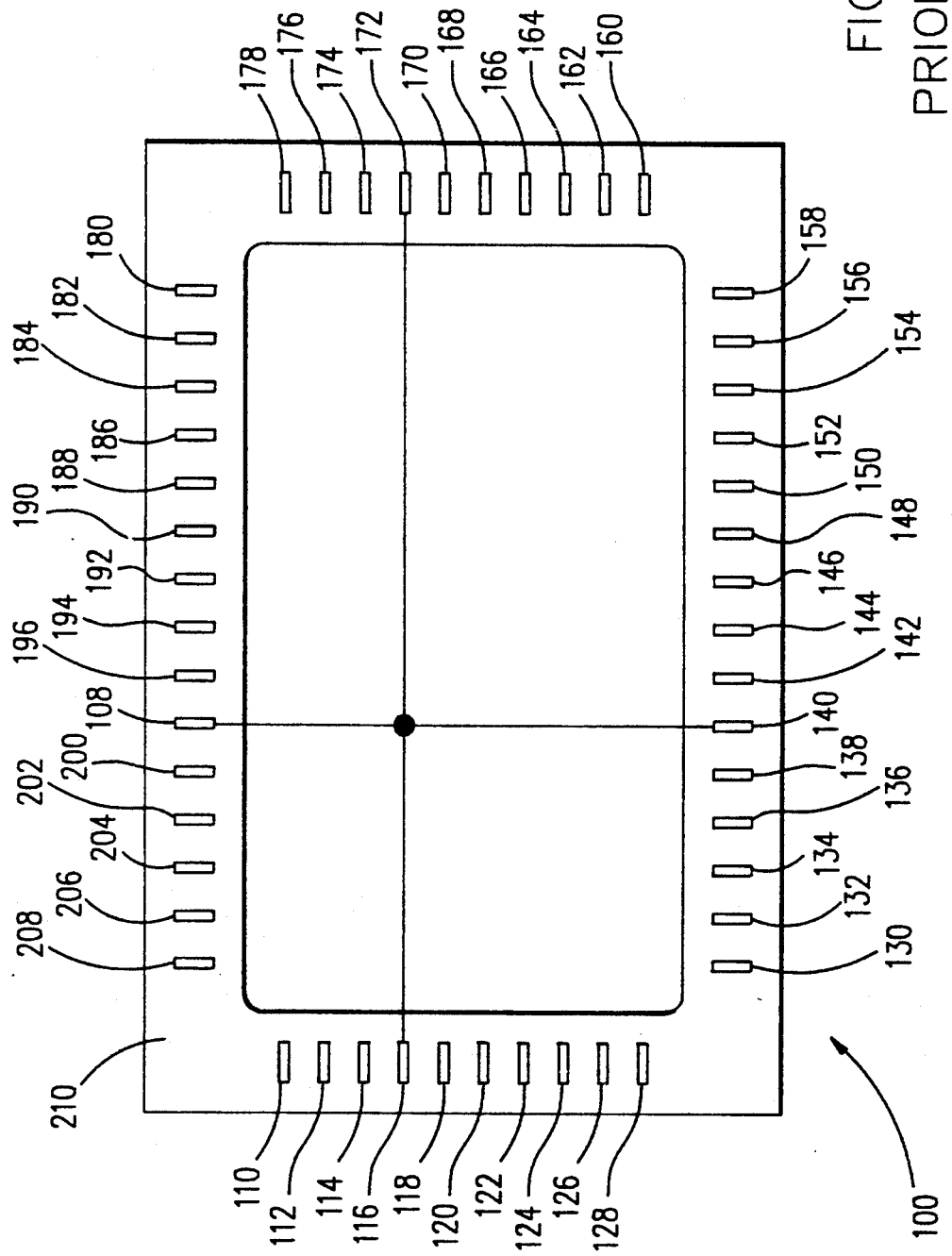
FIG. 1 is a diagram showing an example of a prior art approach to optical touch panels.

To better understand the advantages of the current invention, a brief discussion of a typical prior art approach, as illustrated in FIG. 1, will be presented.

Referring to FIG. 1, the arrangement of components around the front of a touch panel display bezel 100 are shown. The bezel 100 has left vertical side 102, a right vertical side 106, a lower horizontal side 104, and an upper horizontal side 108. Each side has a surface wide enough to allow placement of emitters 110–158 and detectors 160–208 to be mounted under the top surface 210 of the bezel 100. The vertical and horizontal sides 102, 106, 104, 108, respectively are made from material which allows transmitted energy to pass through, thereby allowing an emitter 110–158 on one side of the bezel 100 to activate a corresponding detector 160–208 on the opposite side of the bezel. Each emitter is paired with the detector placed directly opposite it in the bezel. By using conventional multiplexing techniques, the emitter/detector pairs can be scanned one at a time to determine if a stylus (not shown) is blocking light transmitted from the emitter to the detector.

By way of example, if a stylus was placed on the touch panel at location 216, then the light beam 212 from emitter 140 would be prevented from reaching detector 198. Likewise, the light beam 214 from emitter 116 would be prevented from reaching detector 172. As is well known in the art, the location 216 of the stylus can be determined by a simple process of calculation.

In order to determine the location of a stylus, prior art systems require many emitter/detector pairs along with other support circuitry (for example, circuitry required to compensate for imbalances in emitter output or detector sensitivity as well as circuitry required to detect and/or correct defective emitters and detectors). As shown below, the instant invention eliminates the need for all but a single emitter/detector pair as well as the support circuitry the additional emitters and detectors would require.

Figure 2:
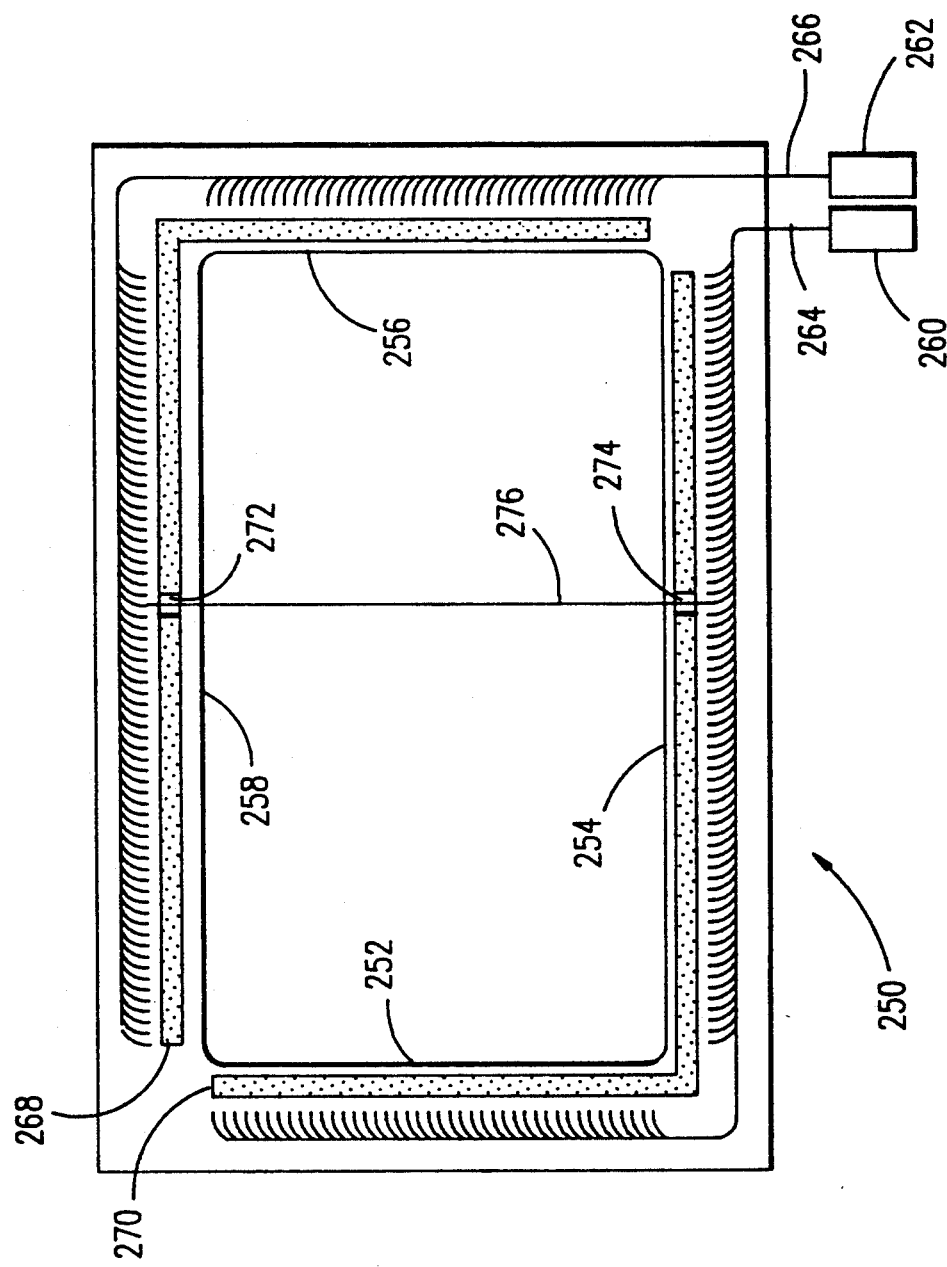
FIG. 2 shows a diagram of the components necessary to implement the invention and their arrangement.

Turning now to the invention, FIG. 2 shows the basic structure of the invention. As in prior art touch panel displays, the components required to implement the invention are integrated into the bezel 250. The bezel 250 also is formed in the same manner as prior art systems with inner surfaces comprised of a left vertical side 252, a right vertical side 256, a lower horizontal side 254, and an upper horizontal side 258. The bezel sides 252–258 are also manufactured from material which can transmit light to enable energy transfer across the predetermined field bounded by the bezel 250.

The light source consists of a single emitter 260. Emitter 260 is activated continuously. The energy output by the emitter 260 enters an emitter fiber-optic bundle 264. The fibers in emitter fiber-optic bundle 264 are distributed around one horizontal side and one vertical side of the bezel 250. In the preferred embodiment, the fibers in emitter fiber-optic bundle 264 are distributed around the lower horizontal side 254 and the left vertical side 252 such that light output from the fibers can illuminate the upper horizontal side 258 and the right vertical side 256 respectively. Those skilled in the art will recognize that while the invention can be implemented with the fibers in emitter fiber-optic bundle 264 arranged around the upper horizontal side 258 rather than the lower horizontal side 254, using the lower horizontal side 254 avoids any interference from extraneous light energy. This is because overhead lighting in an office would provide more extraneous light (i.e., noise) if the fibers in detector fiber-optic bundle 266, used for receiving light, were in the lower horizontal side 254. The choice of left vertical side 252 versus right vertical side 256 for the fibers in emitter fiber-optic bundle 264 is not important. In addition, each fiber can be formed with a lens on the end of the fibers to focus the light such that a more precise beam is directed from one side of the bezel 250 to the other.

In a similar fashion, the fibers in detector fiber-optic bundle 266 are arranged around the upper horizontal side 258 and right vertical side 256. Light output by the fibers in emitter fiber-optic bundle 264 are aimed at fibers which are located directly across from the emitting fibers. The fibers in detector fiber-optic bundle 266 receive light from the emitter fiber-optic bundle 264 and output that light to detector 262. For ease of illustration, the circuitry used to power the emitter 260 and monitor the output of the detector 262 have been omitted since that circuitry is old and well known in the art. Those skilled in the art will recognize that while two fiber-optic bundles 264, 266, are shown, a single bundle whose fibers are appropriately routed could easily replace the two fiber-optic bundles 264, 266, shown. In addition, the emitter 260 and the detector 262 are shown outside of the bezel 250 for ease of illustration, but can easily be mounted in the bezel or elsewhere in the display.

Emitter LCD mask 270 is interposed between the output of emitter fiber-optic bundle 264 and both left vertical side 252 and lower horizontal side 254. Likewise, detector LCD mask 268 is interposed between the input of detector fiber-optic bundle 266 and both right vertical side 256 and upper horizontal side 258. Without the LCD masks 268, 270, light would be transmitted along the length of both the vertical sides 252, 256, and horizontal sides 254, 258, which would make determination of the location of a stylus impossible.

For ease of illustration, the multiplexor circuitry (which is old and well known in the art) used to control the LCD mask is not shown. The LCD masks 268, 270, are kept in a darkened state to prevent light from crossing from left vertical side 252 to right vertical side 256, and to prevent light from crossing from lower horizontal side 254 to upper horizontal side 258. In other words, the LCD masks block energy transmission. The multiplexor circuitry scans a transparent window across the LCD masks by unblocking a small segment (i.e., turning a small segment of the LCD mask transparent) of the LCD mask to create a small window in each LCD mask 268, 270 and synchronously moving the window across the length of the mask. As shown, emitter LCD mask 270 has a small window 274. Likewise, detector LCD mask 268 has a small window 272. The multiplexor circuitry controls the movement of windows 272, 274 such that they are located directly across from one another as they scan across the length of the LCD mask. By synchronously scanning the windows 272, 274, a narrow beam of light 276 can be scanned across the display in alternating horizontal and vertical directions with a single emitter/detector pair.

Those skilled in the art will recognize that several variations in the scanning process can be made. For example, scanning can vary in frequency by increasing the scan rate when a stylus is detected. Likewise, adjacent window locations can be skipped until a stylus is detected and then scanning adjacent locations to determine the exact location of the stylus.

Figure 3:
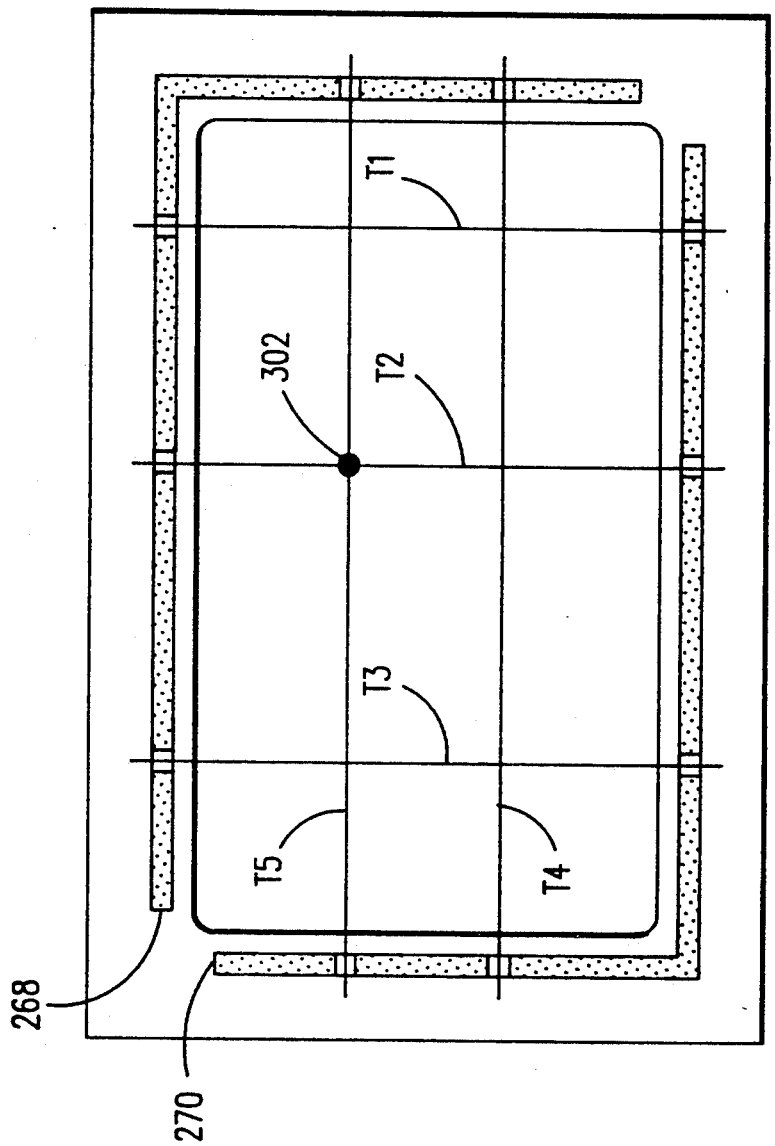
FIG. 3 is a simplified time diagram showing the movement of the energy beam across the display.

FIG. 3 is a time diagram which shows the movement of the window across the LCD masks 268, 270. For illustrative purposes, five time points, T1 through T5 are shown. At time T1, the energy beam is vertical and located on the right side of the display. The multiplexor scans the LCD masks 268, 270 such that the window moves to the left. At time T2, the window has moved farther to the left. At time T3, the window has moved still farther. This process continues until the window, and with it the energy beam, scans the entire width of the display. When the energy beam reaches the left side of the display, the multiplexor begins to scan the windows up the length of the vertical sides of the display. At time T4, the energy beam is shown at the lower portion of the display. Later, at time T5, the window has scanned upward to location T5. At the completion of one full scan, the energy beam will have covered the display area entirely, both in the vertical and horizontal directions.

The location of a stylus is shown at 302. During the vertical portion of the scan, the circuitry attached to the detector 262 (shown in FIG. 2) would recognize the absence of energy at time T2. Likewise, during the horizontal portion of the scan, at time T5, the circuitry controlling the detector 262 would also recognize the absence of energy. Calculation of the location of the stylu at 302 from the location of the beams at times T2 and T5 can easily be done by techniques well known in the art.

While the invention has been described with respect to a preferred embodiment thereof, it will be understood by those skilled in the art that various changes in detail my be made therein without departing from the spirit, scope, and teaching of the invention. For example, although two masks were used in the preferred embodiment, the invention could be implemented with a single mask over the detector fiber-optic bundle. Two or more emitters can be used to provide light, thereby increasing display reliability by allowing defective emitter replacement during scheduled maintenance periods. For the same reason, two or more detectors can be used. Separate multiplexor circuits for the horizontal and vertical portions of the masks would allow simultaneous vertical and horizontal scans, thereby increasing scan rates. The invention can be implemented on a display with an integrated bezel or on a bezel which is a self-contained unit that can be attached to a separate display device. The sides of the frame need not be flat since arced or curved sides which allow formation of an energy beam matrix will function just as well. Accordingly, the invention herein disclosed is to be limited only as specified in the following claims.

We claim:

1. An optical input device for detecting and communicating to a computer the position of a stylus within a predetermined field, said optical input device comprising:
   a frame having a first vertical side, a second vertical side, a first horizontal side, and a second horizontal side;
   a single energy emitter;
   a single energy detector;
   a fiber optic bundle having first, and second energy paths, the input of the first energy path connected to the energy emitter and the output of the first energy path connected to the first vertical and horizontal sides of the frame, the input of the second energy path connected to the energy detector;
   a vertical mask between the first and second vertical sides of the frame;
   a horizontal mask between the first and second horizontal sides of the frame;
   a multiplexor having means to selectively control energy transmission through said vertical and horizontal masks;
   whereby the computer determines the location of a stylus by detecting the absence of detected energy when energy transmission is selectively controlled.

2. An optical input device, as recited in claim 1, wherein the multiplexor further comprises:
   means to synchronously scan the vertical mask such that only a narrow beam of energy can travel from the first vertical side to the second vertical side at any point in time;
   means to synchronously scan the horizontal mask such that only a narrow beam of energy can travel from the first horizontal side to the second horizontal side at any point in time.

3. An optical input device, as recited in claim 2, wherein the multiplexor further comprises:
   means to receive control signals from a computer;
   means to control selective energy transmission through the vertical mask and the horizontal mask with the control signals received from the computer.

4. An optical input device, as recited in claim 3, wherein the multiplexor further comprises:
   means to mask all of the horizontal sides when the vertical mask is scanned, and mask all of the vertical sides when the horizontal mask is scanned.

5. An optical input device, as recited in claim 1, wherein the vertical and horizontal masks are LCD circuits.

6. An optical input device, as recited in claim 5, wherein the vertical and horizontal masks further comprise:
first and second vertical masks attached respectively to the first and second vertical sides of the frame, the masks arranged such that they lie in the path of energy transmitted from the first vertical side of the frame; and
first and second horizontal masks attached respectively to the first and second horizontal sides of the frame, the masks arranged such that they lie in the path of energy transmitted from the first horizontal side of the frame.

7. An optical input device, as recite in claim 6, wherein:
the first and second energy paths are fibers in the fiber optic bundle.

8. An optical input device, as recited in claim 7, wherein:
the first energy path is connected at one end to the energy emitter such that energy from the energy emitter enters the first energy path and travels the length of the first energy path;
the first energy path is connected at the other end to the first horizontal side and the first vertical side such that the first horizontal side and the first vertical side do not obstruct the energy when the energy exits the first energy path;
the fibers in the first energy path further connected such that energy exiting the first energy path is transmitted from a wide area of the first horizontal side and the first vertical side;
the second energy path is connected at one end to the second horizontal side and the second vertical side, the fibers in the second energy path are arranged such that energy received along a wide area of the second horizontal side from the first horizontal side and energy received along a wide area of the second vertical side from the first vertical side enter the second energy path;
the second energy path is connected at the other end to the energy detector such that energy traveling through the second energy path is detected by the energy detector.

9. An optical input device, as recited in claim 8, wherein:
the fibers in the first energy path further connected such that energy exiting the first energy path is transmitted substantially perpendicular to the surfaces of the first horizontal side and the first vertical side, and toward the second horizontal side and the second vertical side respectively.

10. An optical input device, as recited in claim 7, wherein:
the energy emitter produces energy in the infrared range;
the energy detector detects energy in the infrared range.

11. An optical input device for detecting and communicating to a computer the location of a stylus within a predetermined field, comprising:
a frame;
the frame further comprising a first vertical side, a second vertical side, a first horizontal side, and a second horizontal side;
a single energy emitter;
a single energy detector;
a fiber optic bundle;
the fiber optic bundle having a first energy path connected at one end to the energy emitter such that energy from the energy emitter enters the first energy path and travels through the fibers of the energy path;
the first energy path connected at the other end to the first horizontal side and the first vertical side such that the first horizontal side and the first vertical side do not obstruct the energy when the energy exits the first energy path;
the fibers in the first energy path further arranged such that energy exiting the first energy path is transmitted from a wide area of the first horizontal side and the first vertical side substantially perpendicular to the surfaces of the first horizontal side and the first vertical side, and toward the second horizontal side and the second vertical side respectively;
the fiber optic bundle having a second energy path connected at one end to the second horizontal side and the second vertical side, the fibers in the second energy path arranged such that energy received along a wide area of the second horizontal side from the first horizontal side, and energy received along a wide area of the second vertical side from the first vertical side enter the fibers;
the second energy path connected at the other end to the energy detector such that energy traveling through the second energy path is detected by the energy detector;
the energy detector further having means to provide a signal to the computer indicating the presence or absence of energy;
first and second vertical LCD masks attached respectively to the first and second vertical sides of the frame, the masks arranged such that they lie in the path of energy transmitted from the first vertical side to the second vertical side;
first and second horizontal LCD masks attached respectively to the first and second horizontal sides of the frame, the masks arranged such that they lie in the path of energy transmitted from the first horizontal side to the second horizontal side;
a multiplexor having means to receive control signals from the computer;
the multiplexor having means to synchronously scan the first and second vertical LCD masks such that only a narrow beam of energy can travel from the first vertical side to the second vertical side at any point in time;
the multiplexor having means to synchronously scan the first and second horizontal LCD masks such that only a narrow beam of energy can travel from the first horizontal side to the second horizontal side at any point in time;
the multiplexor having means to mask all first and second horizontal LCD masks when the first and second vertical LCD masks are scanned, and mask all first and second vertical LCD masks when the first and second horizontal LCD masks are scanned.

12. An optical input device, as recited in claim 11, wherein:
the energy emitter produces energy in the infrared range;

the energy detector detects energy in the infrared range.

13. A method for detecting and communicating to a computer the location of a stylus within a predetermined field, said method comprising:
emitting energy from a single energy emitter;
guiding energy from said energy emitter through a first energy path comprising fibers in a fiber optic bundle, to first horizontal and fist vertical sides of the predetermined field;
making the first horizontal and first vertical sides of the predetermined field to prevent energy from traveling across the predetermined field to second horizontal and second vertical sides;
multiplexing the mask to selectively control energy transmission through the vertical and horizontal masks;
guiding energy arriving at the second horizontal and second vertical sides through a second energy path comprising fibers in the fiber optic bundle, to a single energy detector;
calculating in the computer the location of a stylus using signals from he energy detector and multiplexor position information.

14. A method, as recited in claim 13, further including the step of:
synchronously scanning the vertical mask such that only a narrow beam of energy can travel from the first horizontal side to the second horizontal side at any point in time.

15. A method, as recited in claim 14, further including the steps of:
receiving control signals from a computer;
controlling the selective energy transmission through the vertical mask and the horizontal mask with the control signals received from the computer.

16. A method, as recited in claim 15, further including the step of:
masking all of the horizontal sides when the vertical mask is scanned, and all of the vertical sides when the horizontal mask is scanned.

17. A system for detecting and communicating to a computer the position of a stylus within a predetermined field, said device comprising:
a computer; and
an optical input device; further comprising:
a single energy emitter;
a single energy detector having means for outputting a signal to indicate the presence of detected energy;
a frame having a first vertical side, a second vertical side, a first horizontal side, and a second horizontal side, each of the sides capable of conducting energy emitted from the energy emitter;
a fiber optic bundle having first and second energy paths, the first energy path having an input end for receiving energy from the energy emitter and an output end connected to the first vertical and horizontal sides of the frame for outputting the energy through the first vertical and horizontal sides of the frame, the second energy path having an input end connected to the second vertical and horizontal sides of the frame for receiving energy outputted from the first energy path and an output end for outputting energy to the energy detector;
an output mask for blocking energy output from the first energy path;
an input mask for blocking energy from entering the second energy path; and
multiplexor means to selectively control energy transmission from the first sides of the frame to the second sides of the frame by selectively unblocking portions of the output mask and portions of the input mask which are opposed from one another on opposite sides of the frame;
whereby the computer determines the location of a stylus by detecting the absence of energy when said energy mask is selectively unblocked.

18. A system, as recited in claim 17, wherein the multiplexor further comprises:
means to synchronously scan the input mask and the output mask such that only a narrow beam of energy can travel from the first vertical side of the frame to the second vertical side of the frame at any point in time; and
means to synchronously scan the input mask and the output mask such that only a narrow beam of energy can travel from the first horizontal side of the frame to the second horizontal side of the frame at any point in time.

19. A system, such as recited in claim 18, wherein the multiplexor further comprises:
means to mask all of the first and second horizontal sides when the first and second vertical sides are scanned, and mask all of the first and second vertical sides when the first and second horizontal sides are scanned.

20. A system, such as recited in claim 17, wherein the vertical and horizontal masks are LCD circuits.

21. A system, as recited in claim 20, wherein:
the first and second energy paths are fibers in the fiber optic bundle.

22. An optical input device, as recited in claim 21, wherein:
the energy emitter produces energy in the infrared range;
the energy detector detects energy in the infrared range.

23. An optical input device for locating the position of a stylus within a predetermined field, comprising:
a frame for defining a predetermined field, the frame having a first vertical side, a second vertical side, a first horizontal side, and a second horizontal side;
a single energy emitter;
a first group of fiber-optic fibers for distributing energy along the first vertical and first horizontal sides, the fibers in the first group aligned such that energy is transmitted across the predetermined field in the form of a matrix;
a single energy detector;
a second group of fiber-optic fibers for receiving energy along the second vertical and second horizontal sides and connected to the energy detector the fibers in the group aligned such that energy in substantially all of the matrix can be detected;
a scannable mask for blocking energy in the matrix such that only a single beam of energy is allowed to cross from the first horizontal and vertical sides at any point in time;
a multiplexor for controlling the location of the unblocked portion of the scannable mask;
calculating means to determine the location of the intersection of the horizontal and vertical energy beams interrupted by a stylus;
whereby the location of a stylus in a predetermined field can be determined by an optical device with a single emitter and a single detector.

* * * * *